(No Model.)  2 Sheets—Sheet 1.
H. E. HAYES.
COMBINED BLACKBOARD AND MAP SUPPORT.
No. 351,914. Patented Nov. 2, 1886.
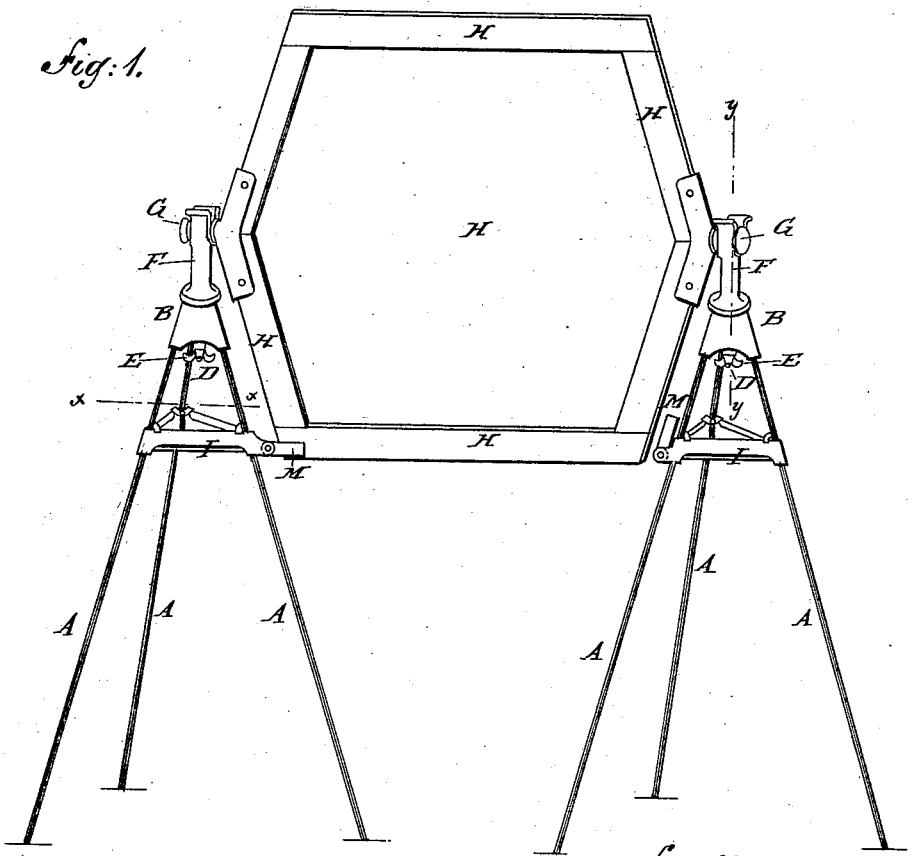
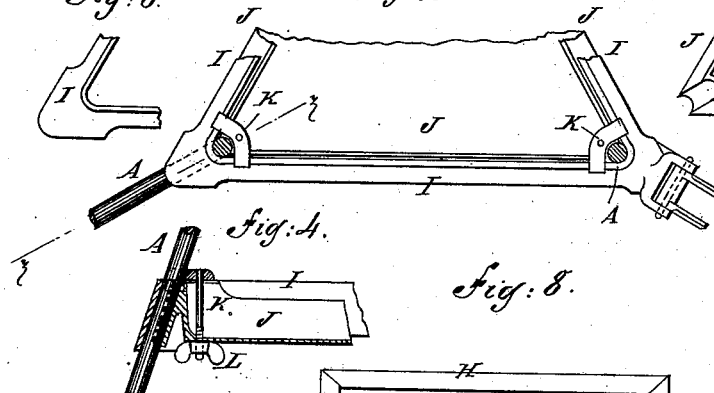
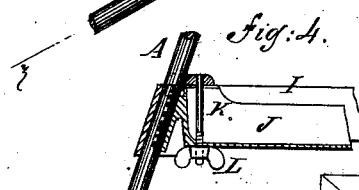
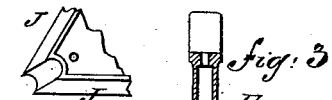
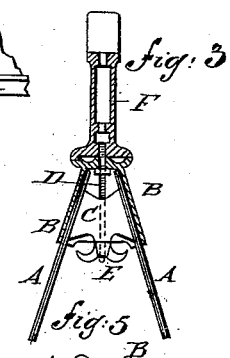
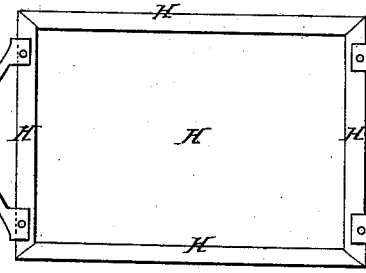
Witnesses:
Chas. Nida
C. Sedgwick
Inventor:
H. E. Hayes
by Munn & Co
Attorneys.

(No Model.) 2 Sheets—Sheet 2.
H. E. HAYES.
COMBINED BLACKBOARD AND MAP SUPPORT.
No. 351,914. Patented Nov. 2, 1886.
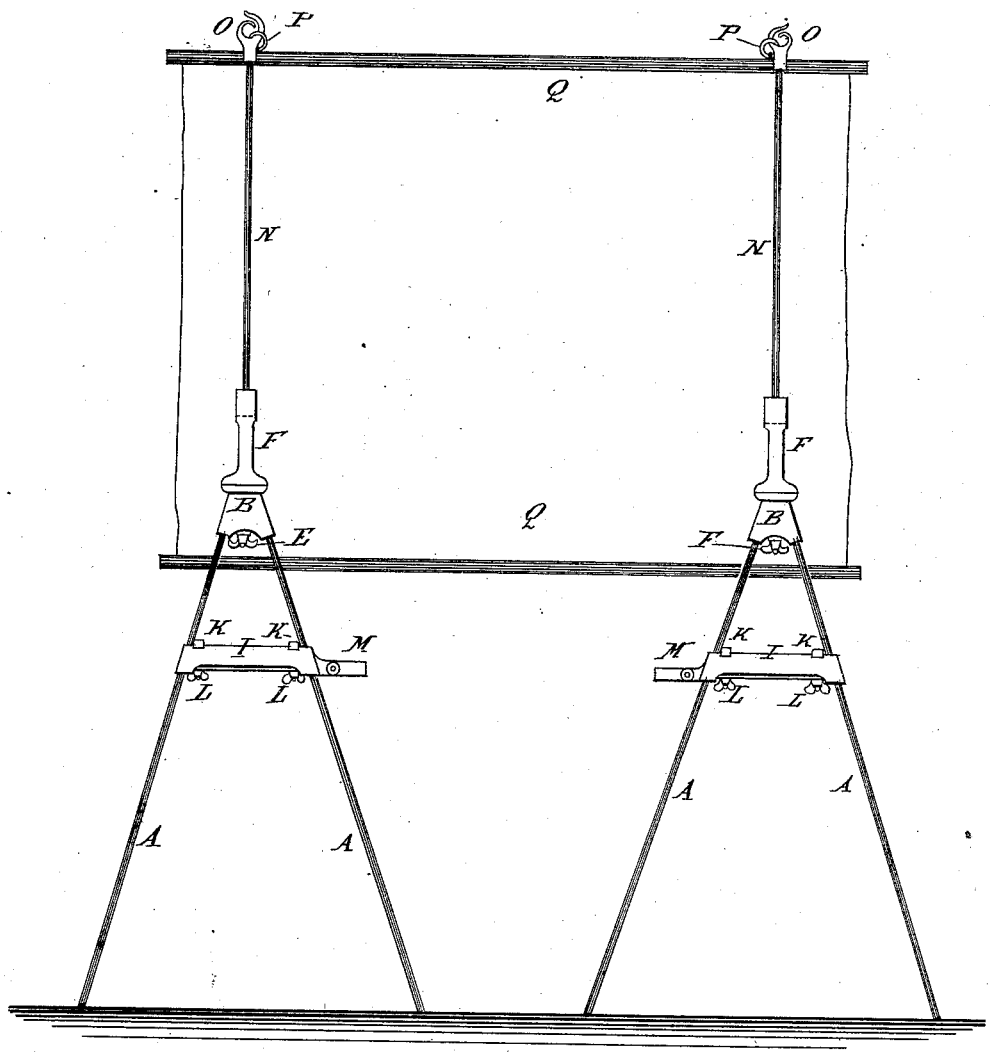
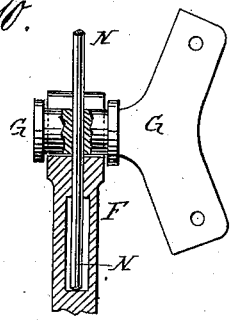

UNITED STATES PATENT OFFICE.

HENRY E. HAYES, OF BROOKLYN, NEW YORK.

COMBINED BLACKBOARD AND MAP SUPPORT.

SPECIFICATION forming part of Letters Patent No. 351,914, dated November 2, 1886.

Application filed February 20, 1886. Serial No. 192,650. (No model.)

*To all whom it may concern:*

Be it known that I, HENRY E. HAYES, of Brooklyn, in the county of Kings and State of New York, have invented a new and useful Improvement in Combined Map, Chart, and Blackboard Supports, of which the following is a full, clear, and exact description.

Reference is to be had to the accompanying drawings, forming a part of this specification, in which similar letters of reference indicate corresponding parts in all the figures.

Figure 1 is a front elevation of my improvement arranged as a blackboard-support. Fig. 2 is a sectional plan view of a part of the same, taken through the line $x$ $x$, Fig. 1. Fig. 3 is a sectional elevation of a part of the same, taken through the line $y$ $y$, Fig. 1. Fig. 4 is a sectional elevation of a part of the same, taken through the line $z$ $z$, Fig. 2. Fig. 5 is a bottom view of one of the rod-clamps, the rods being shown in section. Fig. 6 is a plan view of a corner of the outer part of the combined brace and crayon-pan. Fig. 7 is a plan view of a corner of the inner part of the combined brace and crayon-pan. Fig. 8 shows the blackboard-gudgeons applied to a square blackboard-frame. Fig. 9 is a rear elevation of my improvement arranged as a map and chart support. Fig. 10 is a view showing how a map or chart may be supported without taking down the blackboard.

The object of this invention is to provide combined map, chart, and blackboard supports constructed in such a manner as to receive a blackboard, or a map or chart, or both, at the same time, and which will allow the blackboards to be readily reversed.

The invention consists in the construction and combination of various parts of the combined map, chart, and blackboard support, as will be hereinafter fully described.

A are rods, which are arranged three in a set, and two sets of which are used. The upper ends of each three rods are inserted in the angles of a triangular case, B, where they are clamped in place by a triangular block, C, which is perforated longitudinally to receive the screw D, secured to the upper end of the case B, and provided with a hand-nut, E, upon its lower end, so that by screwing up the hand-nut E the triangular block C will be forced up into the triangular case B, to clamp the rods A in the angles of the said case. The case B and block C are flared to give such a flare to the rods A as will cause the supports to stand firmly.

As thus far described the construction is the same as that shown and described in Letters Patent No. 295,636, granted to me March 25, 1884.

To the upper ends of the cases B are secured, by upward extensions of the screws D, the lower ends of the studs F, in the upper ends of which are formed half-bearings, to receive the gudgeons G, the bases of which are secured to the ends of the frame of the blackboard H.

The blackboard shown in Fig. 1 is represented as having angular ends, so that the corners of the said blackboard will swing past the flaring rods A without coming in contact with them, to allow the said blackboard to be adjusted in a vertical position, and to be reversed without coming in contact with the said rods.

In case it be desired to use a square blackboard, the bases of the gudgeons G can be extended, as illustrated in Fig. 8, so that the corners of the blackboard can swing past the rods A.

I is a triangular band, which passes around the rods A a little below the clamp B C D E, and thus holds the said rods from spreading. Within the band I is placed a triangular pan, J, the angles of which are inclined and grooved, as illustrated in Fig. 7, to receive and fit upon the rods A. In the angles of the pan J are formed perforations to receive the screws K, which have curved cross-heads upon their upper ends to rest upon the upper edges of the band I and pan J, and have hand-nuts L screwed upon their lower ends to rest against the bottom of the pan J, as shown in Fig. 4, so that by tightening the said band-nuts the band I and pan J are made to clamp the rods A and serve as a brace to hold the said rods from spreading. The pan J serves as a receptacle for crayons and blackboard-cleaners.

To lugs formed upon the inner angles of the bands I are hinged U-shaped clamps M, which can be turned down to grasp the frame of the blackboard and hold it stationary while being used, as shown in the left-hand part of Fig. 1, and can be turned up, as shown in the right-hand part of Fig. 1, to release the blackboard and allow it to be reversed.

The studs F are perforated longitudinally from their upper ends to receive the lower ends of the rods N, which have hooks O upon their upper ends to receive the rings P, or the tapes attached to the top bar of a map or chart, Q.

By this construction maps and charts can be readily suspended, so that they can be conveniently seen by a class or the whole school, and can be easily moved from one part of a room to another, or from one room to another, as may be required.

By perforating the gudgeons G in line with the perforations of the studs F, the rods N can be passed through the said gudgeons and into the said studs, as illustrated in Fig. 10, so that maps or charts can be readily suspended without removing the blackboard.

Having thus fully described my invention, I claim as new and desire to secure by Letters Patent—

1. The combination, with the rods A and the rod-clamps B C D E, of the studs F, having half-bearings at their upper ends, substantially as herein shown and described, to receive gudgeons attached to the ends of a blackboard and support the said blackboard, as set forth.

2. The combination, with the rods A, the rod-clamps B C D E, and a blackboard, H, of the studs F, attached to the said clamps, and having half-bearings at their upper ends, and the gudgeons G, attached to the said blackboard and resting in the said half-bearings, substantially as herein shown and described, whereby the said blackboard will be firmly supported and can be readily reversed, as set forth.

3. In a combined map, chart, and blackboard support, the combination, with the rods A and the clamps B C D E, connecting the said rods, of the triangular band I, placed around the said rods, the triangular pan J, having grooved angles, and placed within the said band and between the said rods, and the screws K, having curved cross-heads and hand-screws L, substantially as herein shown and described, whereby the said rods are strengthened in position and a receptacle is provided for crayons and blackboard-cleaners, as set forth.

4. The combination, with the rods A, the clamps B C D E, connecting the said rods, studs F, attached to the said clamps and carrying the blackboard, and the band I and pan J, clamped to the said rods, of the U-shaped clamps M, hinged to the said bands, substantially as herein shown and described, whereby the suspended blackboard can be held stationary, as set forth.

5. The combination, with the rods A, the clamps B C D E, connecting the said rods, and the studs F, attached to the said clamps and having longitudinal perforations, of the rods N, inserted in the said perforations and provided with hooks O at their upper ends, substantially as herein shown and described, whereby maps and charts can be readily suspended, as set forth.

HENRY E. HAYES.

Witnesses:
JAMES T. GRAHAM,
EDGAR TATE.